United States Patent
Imasugi

(10) Patent No.: US 10,580,132 B2
(45) Date of Patent: Mar. 3, 2020

(54) MEDICAL IMAGE PROCESSING APPARATUS, CONTROL METHOD THEREFOR, AND NON-TRANSITORY STORAGE MEDIUM STORING PROGRAM

(71) Applicant: CANON KABUSHIKI KAISHA, Tokyo (JP)

(72) Inventor: Yusuke Imasugi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 15/944,159

(22) Filed: Apr. 3, 2018

(65) Prior Publication Data
US 2018/0300875 A1 Oct. 18, 2018

(30) Foreign Application Priority Data

Apr. 13, 2017 (JP) .................................. 2017-079652
Dec. 27, 2017 (JP) .................................. 2017-250356

(51) Int. Cl.
| | |
|---|---|
| *G06T 7/00* | (2017.01) |
| *G06T 5/00* | (2006.01) |
| *G06T 5/50* | (2006.01) |
| *G06T 7/174* | (2017.01) |

(Continued)

(52) U.S. Cl.
CPC ............ *G06T 7/0012* (2013.01); *G06T 5/002* (2013.01); *G06T 5/005* (2013.01); *G06T 5/50* (2013.01); *G06T 7/11* (2017.01); *G06T 7/174* (2017.01); *G06T 11/008* (2013.01); *G06T 2207/10081* (2013.01); *G06T 2207/10088* (2013.01); *G06T 2207/30008* (2013.01); *G06T 2207/30021* (2013.01); *G06T 2207/30048* (2013.01);

(Continued)

(58) Field of Classification Search
None
See application file for complete search history.

(56) References Cited

U.S. PATENT DOCUMENTS

2008/0181475 A1* 7/2008 Imasugi .................. G06T 15/08
382/128
2008/0192898 A1* 8/2008 VanMetter ............ G06T 11/008
378/98.9

(Continued)

FOREIGN PATENT DOCUMENTS

JP 2010-11980 A 1/2010

OTHER PUBLICATIONS

Postma, Alida A., et al. "Dual-energy CT of the brain and intracranial vessels." American Journal of Roentgenology 199.5_ supplement (2012): S26-S33. (Year: 2012).*

*Primary Examiner* — Samah A Beg
(74) *Attorney, Agent, or Firm* — Canon U.S.A., Inc. IP Division

(57) ABSTRACT

A medical image processing apparatus acquires a virtual non-contrast image generated by using a first medical image acquired by image-capturing a subject containing a contrast agent with a first energy and a second medical image acquired by image-capturing the subject with a second energy, identifies a removal-subject region included in the acquired virtual non-contrast image, identifies a region of the first medical image or the second medical image, the region corresponding to the identified removal-subject region, and changes luminance values of the identified region identified to a value lower than the luminance value.

11 Claims, 10 Drawing Sheets

(51) Int. Cl.
*G06T 7/11* (2017.01)
*G06T 11/00* (2006.01)

(52) U.S. Cl.
CPC ............... *G06T 2207/30101* (2013.01); *G06T 2211/408* (2013.01)

(56) References Cited

U.S. PATENT DOCUMENTS

| | | | | |
|---|---|---|---|---|
| 2008/0260092 | A1* | 10/2008 | Imai | A61B 6/032 |
| | | | | 378/5 |
| 2010/0067772 | A1* | 3/2010 | Kitamura | A61B 6/482 |
| | | | | 382/132 |
| 2010/0328313 | A1* | 12/2010 | Zamyatin | G06K 9/342 |
| | | | | 345/440 |
| 2011/0064292 | A1* | 3/2011 | Chen | G06T 5/002 |
| | | | | 382/131 |
| 2014/0133729 | A1* | 5/2014 | Goshen | G06T 5/002 |
| | | | | 382/131 |
| 2016/0123904 | A1* | 5/2016 | Masood | G01N 23/046 |
| | | | | 382/131 |
| 2016/0321803 | A1* | 11/2016 | Lamash | G06T 7/0012 |
| 2017/0301082 | A1* | 10/2017 | Allmendinger | G06T 7/0012 |
| 2018/0042565 | A1* | 2/2018 | Wilson | A61B 6/032 |
| 2018/0165812 | A1* | 6/2018 | Flohr | A61B 6/032 |
| 2018/0276853 | A1* | 9/2018 | Carmi | G06T 11/003 |
| 2019/0236818 | A1* | 8/2019 | Ritter | A61B 6/032 |

* cited by examiner

FIG. 4
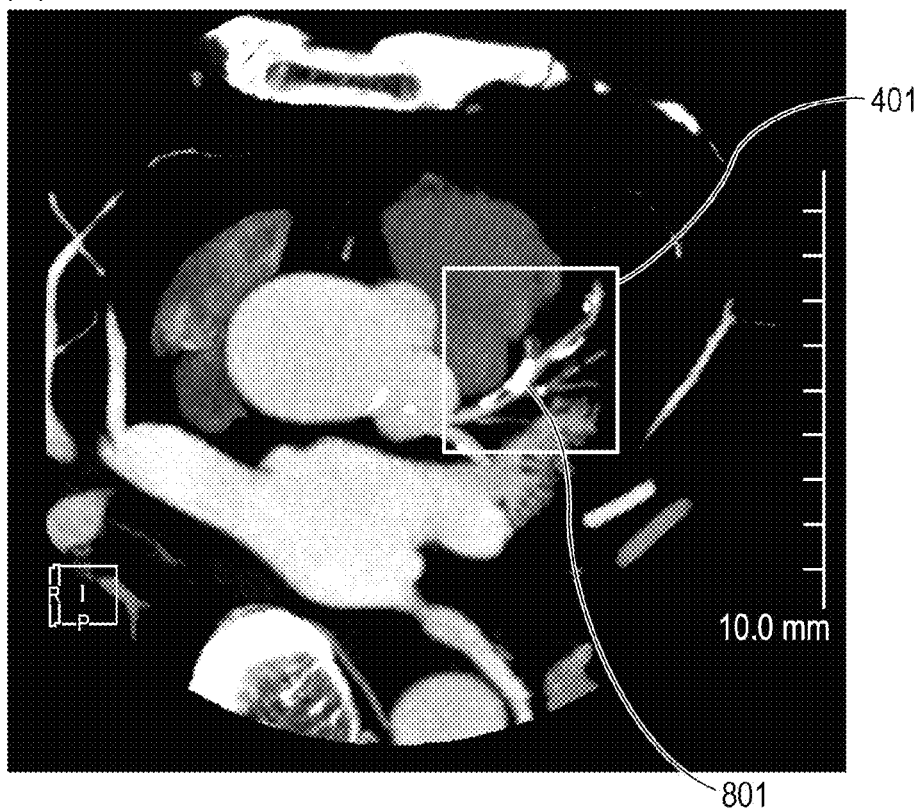
(A) HIGH ENERGY TOMOGRAPHIC IMAGE 10
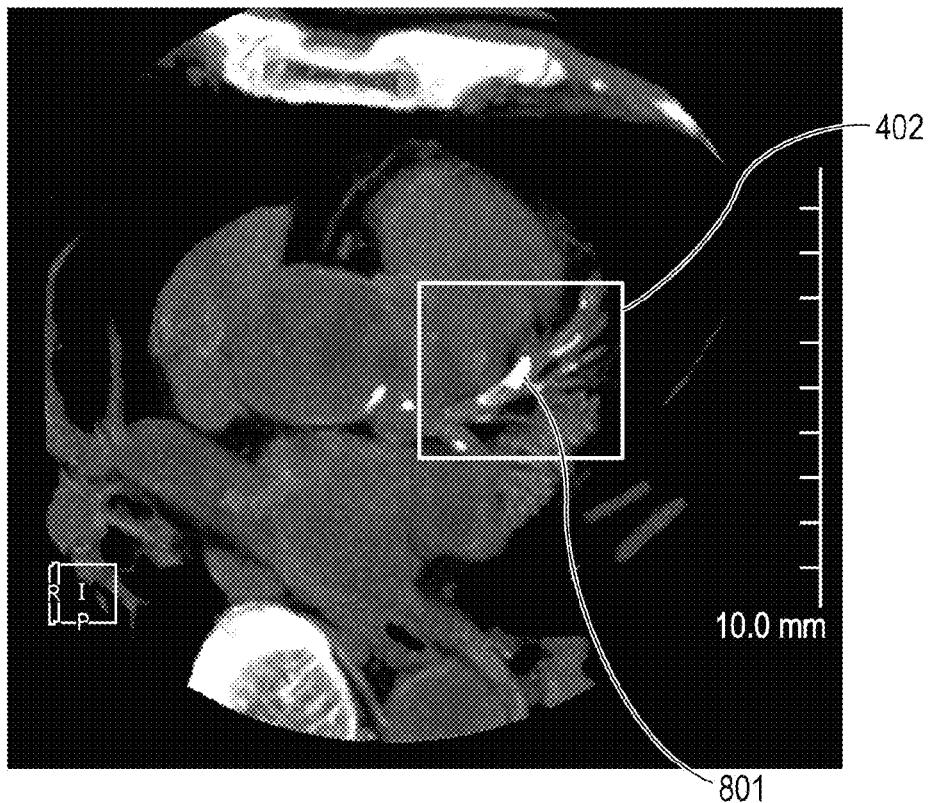
(B) VIRTUAL NON-CONTRAST IMAGE (VNC IMAGE) 20

FIG. 6
(D) HIGH ENERGY TOMOGRAPHIC IMAGE 10
(AFTER REMOVAL OF CALCIFIED REGION)
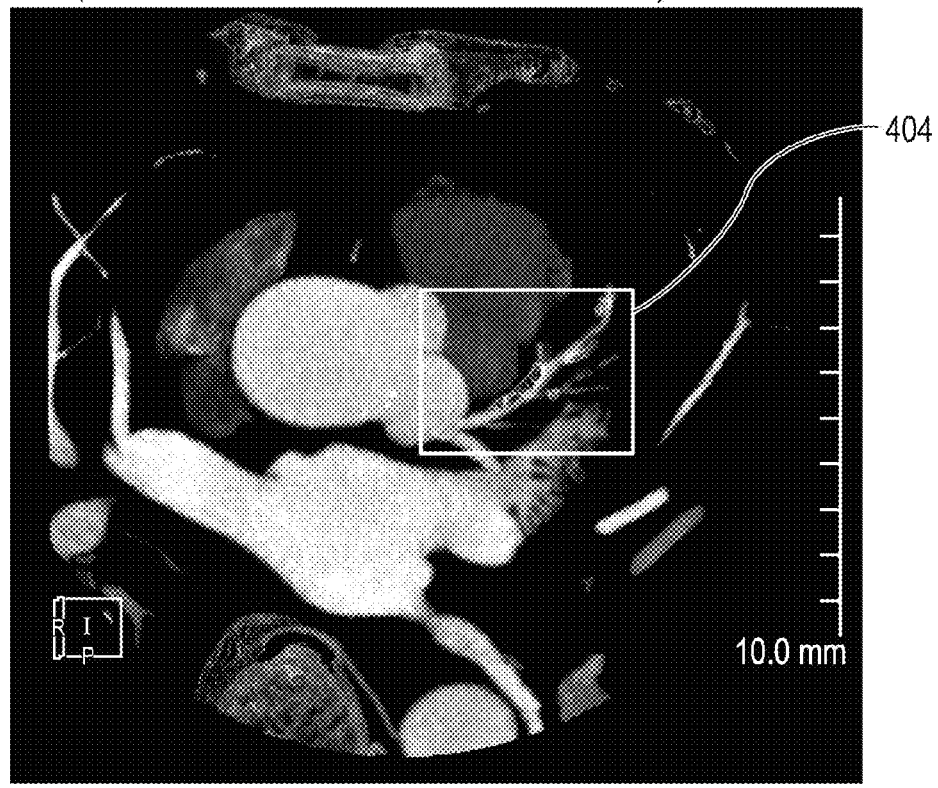
(E) HIGH ENERGY TOMOGRAPHIC IMAGE 10
(AFTER REMOVAL OF CALCIFIED REGION AND SMOOTHING)
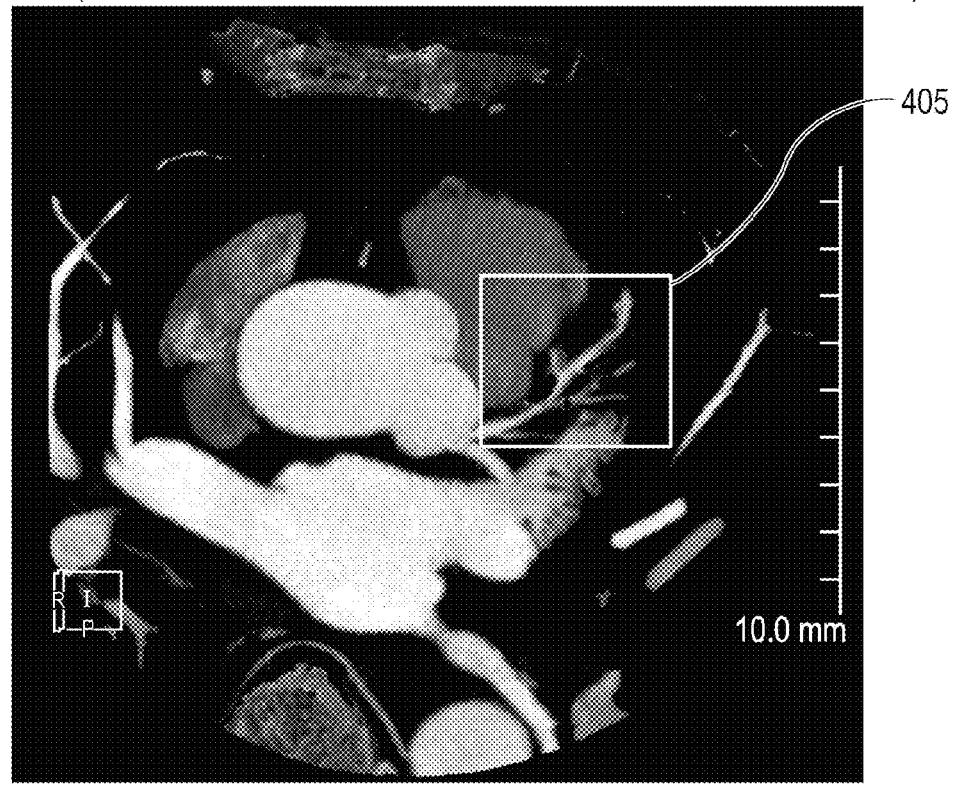

MEDICAL IMAGE PROCESSING APPARATUS, CONTROL METHOD THEREFOR, AND NON-TRANSITORY STORAGE MEDIUM STORING PROGRAM

BACKGROUND

Field of the Disclosure

The present disclosure relates to a medical image processing apparatus which can provide an image enabling a user to easily diagnose a patient while reducing the exposure dose of the patient, a control method therefor, and a non-transitory storage medium storing a program.

Background of the Disclosure

A user (such as a doctor) may diagnose a state of a blood vessel by using a tomographic image captured by a modality such as a CT apparatus. Particularly, in order for a user to determine a catheter operation relating to a thin blood vessel such as a coronary artery, it is important for the user to grasp how much a calcified region within the blood vessel has an influence on stricture of the blood vessel.

A user may perform an operation by indwelling an artificial tool, such as a stent-graft within a blood vessel, then injecting a contrast agent to the blood vessel and capturing an image of the operated region for postoperative follow-up. When the blood vessel containing the contrast agent and the calcified region are present around the stent-graft, the user may not easily check the stent-graft. Therefore, a user may need to check a state of the stent-graft in consideration of influences of the contrast agent and the calcified region. The reason why the stent-graft is not easily checked may be that the contrast agent and the calcified region have signal values higher than that of the stent-graft.

Japanese Patent Laid-Open No. 2010-11980 discloses a mechanism for acquiring volume data regarding a contrast-imaged blood vessel and volume data regarding a blood vessel that is not contrast-imaged to locate a calcified region in the blood vessel.

SUMMARY

According to some embodiments, a medical image processing apparatus includes an acquiring unit configured to acquire a virtual non-contrast image generated by using a first medical image acquired by image-capturing a subject including a contrast agent with a first energy and a second medical image acquired by image-capturing the subject with a second energy, a first identifying unit configured to identify a removal-subject region included in the virtual non-contrast image acquired by the acquiring unit, a second identifying unit configured to identify a region of the first medical image or the second medical image, the region corresponding to the removal-subject region identified by the first identifying unit, and a changing unit configured to change luminance values of the region identified by the second identifying unit to a value lower than the luminance value.

Further features of the presented embodiments will become apparent from the following description of exemplary embodiments with reference to the attached drawings.

BRIEF DESCRIPTION OF THE DRAWINGS

FIG. 4 illustrates examples of a high-energy tomographic image and a virtual non-contrast image.

FIG. 6 illustrate examples of a high-energy tomographic image from which a calcified region is removed and a high-energy tomographic image from which a calcified region is removed and on which smoothing processing is performed.

DESCRIPTION OF THE EMBODIMENTS

Figure 1:
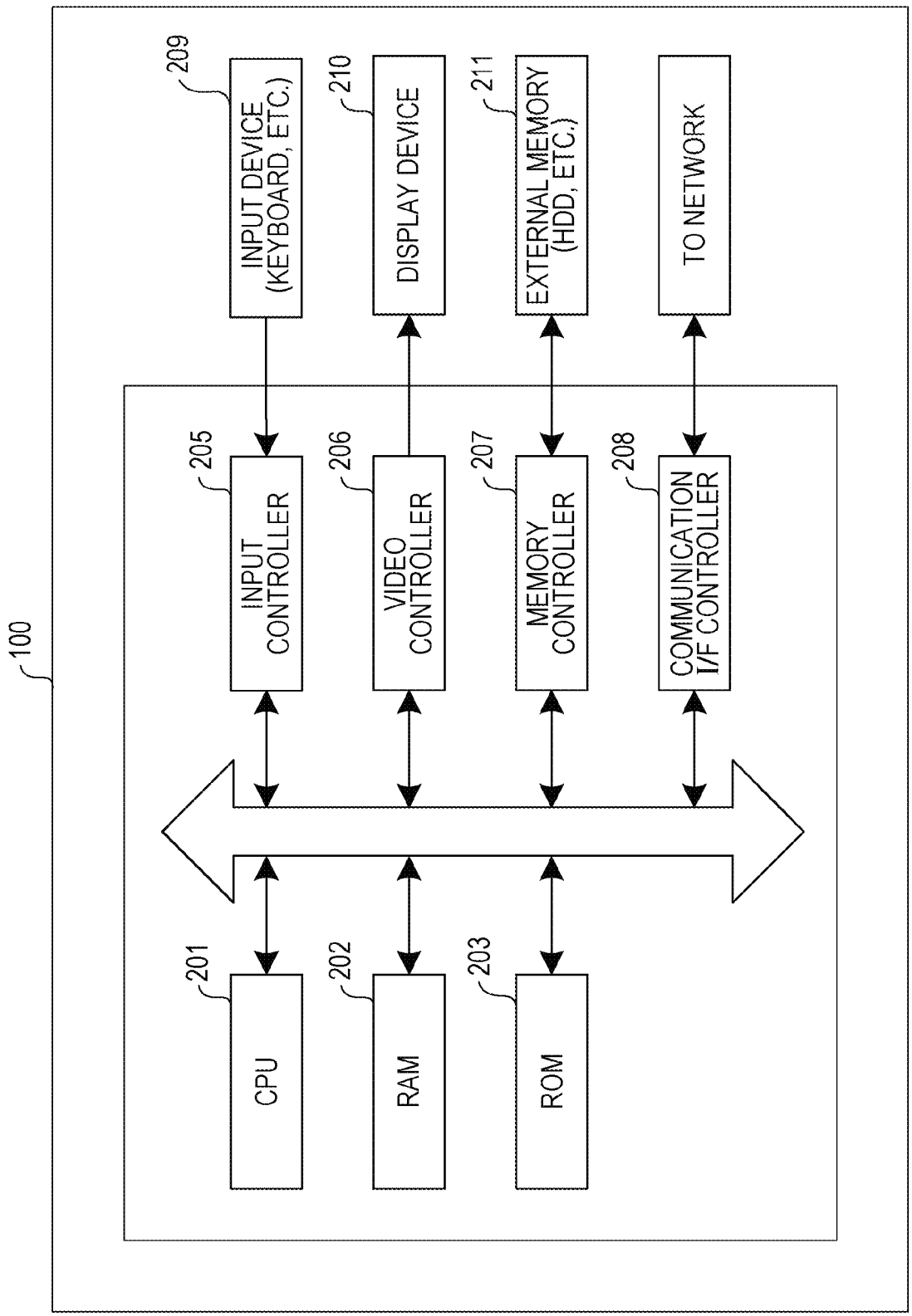
FIG. 1 is a conceptual diagram illustrating a hardware configuration of a medical image processing apparatus according to an embodiment.

Japanese Patent Laid-Open No. 2010-11980 may require at least two image-capturing operations, including capturing an image of a patient to which a contrast agent is not injected and capturing an image of the patient to which a contrast agent is injected, which may disadvantageously increase the exposure dose of the patient. There is also a demand for an image enabling a user to diagnose without being conscious of a calcified region.

According to an embodiment of the present disclosure, a mechanism can provide an image enabling a user to easily diagnose a patient while reducing the exposure dose of the patient. Additionally, according to another embodiment of the present disclosure, effects can be provided which may be led by configurations according to embodiments of the present disclosure, which will be described below.

Embodiments of the present disclosure will be described below with reference to drawings. According to an embodiment, a CT (Computed Tomography) apparatus is applied as a modality 1000. However, this embodiment is also applicable to other modalities, such as an MRI (Magnetic Resonance Imaging) apparatus.

Before describing this embodiment, terms will be described first.

Dual-energy imaging is an imaging scheme using the modality 1000, such as a CT apparatus. An X ray irradiation/detection apparatus included in the modality 1000 may be used to perform imaging by alternately switching the tube voltage between 80 kV (first energy) and 140 kV (second energy) to acquire two types of images. This is called dual-energy imaging. According to this embodiment, an image captured with 80 kV is called a low-energy tomographic image, and an image captured with 140 kV is called a high-energy tomographic image. The values of the tube voltage are not limited thereto but may be other values.

A ratio of a pixel value in a low-energy tomographic image to a pixel value (a luminance value) in a high-energy tomographic image is called a pixel-value (a luminance value) ratio according to this embodiment, and a pixel-value ratio is acquired for each position of an identical voxel in the tomographic images. The pixel-value ratio varies in accordance with the type of substance of a subject. With iodine, for example, the pixel-value ratio may be a value in a range appropriately from 2.00 to 1.55. With calcium, the pixel-value ratio may be a value in a range appropriately from 1.55 to 1.35. The range of pixel-value ratio for each substance may vary depending on the individual differences between subjects and the functional differences between modalities.

Next, a case will be examined in which calcium corresponding to a calcified region 801 (corresponding to a removal-subject region) in the neighborhood of a region having an influence of a contrast agent is precisely removed from an image by using the pixel-value ratio so that a user cannot visually recognize it. In this case, the user may be required to precisely set the range of the calcium pixel-value ratio. Improperly setting the range of the pixel-value ratio may result in improper removal of a region that is not the calcified region 801 (such as a region where a contrast agent effects) or may prevent removal of a region to be removed. This may prevent a user from accurately grasping an influence (or the degree of a blockage of a blood vessel) of the calcified region 801, particularly in an extra-fine blood vessel, such as a coronary artery. In other words, this may require accurate identification of removal of the calcified region 801 on a wall of a coronary artery containing a contrast agent. According to this embodiment, a virtual non-contrast image (VNC image), which will be described below, is used to locate the calcified region 801 present in a tomographic image to remove the calcified region 801 more precisely than before.

FIG. 1 illustrates a hardware configuration of the medical image processing apparatus 100 according to this embodiment. The hardware configuration of the medical image processing apparatus 100 in FIG. 1 is given for illustration purpose and may vary in accordance with its applications and purposes.

The medical image processing apparatus 100 may include a CPU 201, a RAM 202, a ROM 203, an input controller 205, a video controller 206, a memory controller 207, a communication I/F controller 208, an input device 209, a display device 210, and an external memory 211.

The CPU 201 is configured to generally control devices and controllers connected to a system bus. The medical image processing apparatus 100 may include at least one CPU 201, and the medical image processing apparatus 100 may include a plurality of CPUs 201.

The RAM 202 may function as a main memory and a work area for the CPU 201. The CPU 201 is configured to load a program necessary for executing a process to the RAM 202 and to execute the program to implement an operation.

The ROM 203 or the external memory 211 are configured to store a BIOS (Basic Input/Output System) and an operating system that are control programs for the CPU 201. The ROM 203 or the external memory 211 may store programs, which will be described below, for implementing functions executed by devices.

The input controller 205 is configured to control an input from a pointing device (input device 209) such as a keyboard and a mouse.

The video controller 206 is configured to control display on a display device such as the display device 210. The display device 210 (display unit) may be a CRT or a liquid crystal display device, for example.

The memory controller 207 is configured to control access to the external memory 211, such as a hard disk, a flexible disk, and a card type memory connected to a PCMCIA card slot through an adapter, which stores a boot program, browser software, applications, font data, user files, or data.

The CPU 201 may rasterize an outline font to a display information region within the RAM 202, for example, to enable display on the display device 210. The CPU 201 enables a user to instruct through a mouse cursor (not illustrated), for example, on the display device 210.

Programs to be used by the medical image processing apparatus 100 according to this embodiment for executing the corresponding processes are stored in the external memory 211 (corresponding to a storage unit). The programs may be loaded to the RAM 202 and be executed by the CPU 201 as required. Definition files, information tables, medical images and so on to be used by programs according to this embodiment are stored in the external memory 211. Medical images (tomographic images) may be stored in an external server, and the medical image processing apparatus 100 may be configured to acquire a medical image from the external server.

Up to this point, the hardware configuration of the medical image processing apparatus 100 illustrated in FIG. 1 has been described.

Next, with reference to FIG. 2, a functional configuration of the medical image processing apparatus 100 will be described.

The medical image processing apparatus 100 includes an image acquiring unit 101, an image storage unit 102, an VNC image acquiring unit 103, a region-removed image generating unit 104, and a display control unit 105. These functional units may be implemented by the CPU 201 by loading their corresponding programs acquired from the external memory 211 to the RAM 202 and executing the programs.

The image acquiring unit 101 is a functional unit configured to acquire an image from the modality 1000. Although the modality 1000 is a CT apparatus according to this embodiment, the modality 1000 may be an apparatus such as an MRI apparatus in some other embodiments. The modality 1000 is a modality that supports dual-energy imaging. At least a high-energy tomographic image (corresponding to a first medical image) acquired by performing dual-energy imaging on a subject containing a contrast agent and a low-energy tomographic image (corresponding to a second medical image) are acquired. The high-energy tomographic image may be a tomographic image which is captured with a tube voltage of 140 kV, for example, and the low-energy tomographic image may be a tomographic image captured with a tube voltage of 80 kV, for example. It should be noted that the values of the tube voltage are not limited to the aforementioned values but may be other values.

The image storage unit 102 is a functional unit configured to store an image acquired by the image acquiring unit 101. The VNC image acquiring unit 103 is a functional unit configured to acquire a virtual non-contrast image (VCN image) output from the modality 1000. A virtual non-contrast image (VNC image) is an image with a reduced influence of a contrast agent (such as iodine) given to a subject among types of substances categorized based on pixel-value ratios between images captured with different tube voltages. According to this embodiment, a VNC image is acquired from the modality 1000. However, the VNC image acquiring unit 103 may generate a VNC image based on a high-energy tomographic image and a low-energy tomographic image stored in the image storage unit 102.

The region-removed image generating unit 104 is a functional unit configured to generate an image by removing the calcified region 801 from a high-energy tomographic image or a low-energy tomographic image. The calcified region is an example, and other kinds of region may be removed. The display control unit 105 is a functional unit configured to display, in a comparable manner, an image generated by the region-removed image generating unit 104, as well as a high-energy tomographic image and a low-energy tomographic image that are stored in the image storage unit 102 before the region-removed image generating unit 104 removes the calcified region 801 therefrom. An image from which a calcified region is removed may be displayed by Maximum Intensity Projection (MIP). A virtual non-contrast image (VNC image), a high-energy tomographic image, and a low-energy tomographic image according to this embodiment include three-dimensional volume data.

Figure 2:
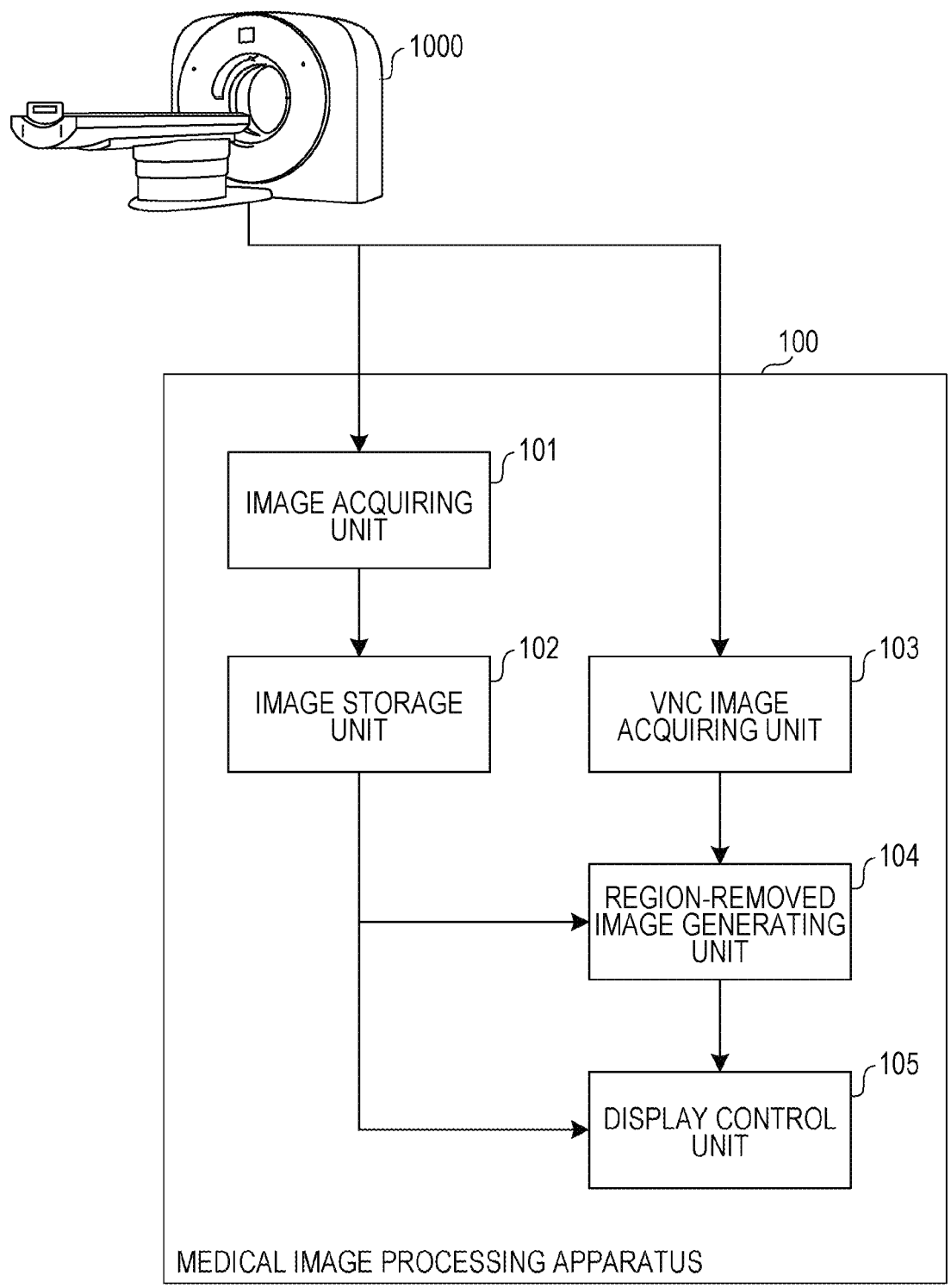
FIG. 2 is a conceptual diagram illustrating a functional configuration of the medical image processing apparatus according to the embodiment.

Up to this point, the functional configuration of the medical image processing apparatus 100 illustrated in FIG. 2 has been described. The functional configuration illustrated in FIG. 2 is given for illustration purposes and may be modified or altered in accordance with applications and purposes.

Figure 3:
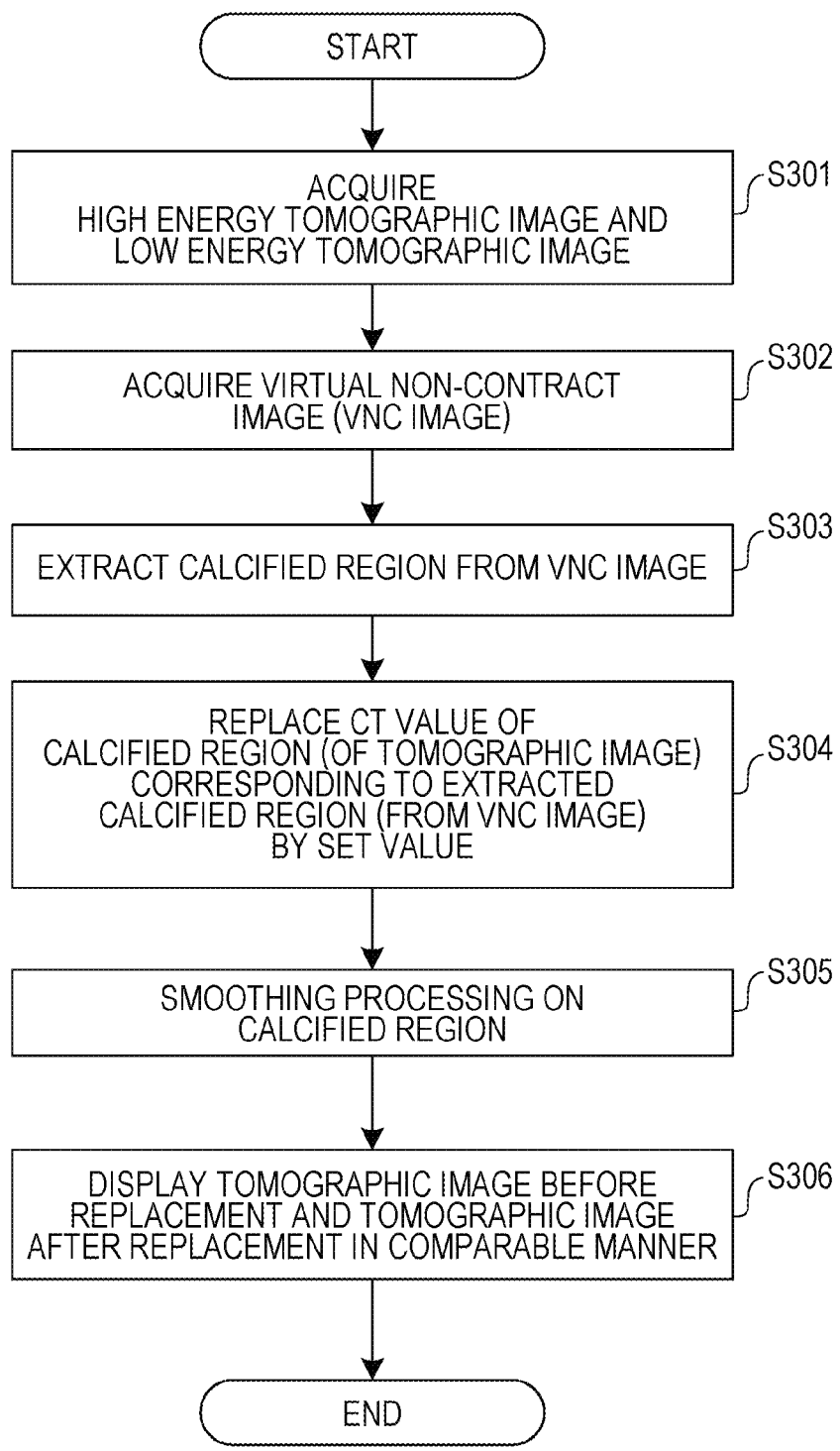
FIG. 3 is a flowchart illustrating a flow of detail processing according to an embodiment.

Next, with reference to FIG. 3, a flow of processing according to this embodiment will be described. FIG. 3 is a flowchart illustrating processing to be performed according to this embodiment.

In step S301, the image acquiring unit 101 in the medical image processing apparatus 100 acquires a high-energy tomographic image (first medical image) and a low-energy tomographic image (second medical image) captured by dual-energy imaging by the modality 1000. The timing for acquiring the high-energy tomographic image and the low-energy tomographic image is not particularly limited. In advance, a high-energy tomographic image and a low-energy tomographic image may be acquired and may be stored in the external memory 211. FIG. 4 illustrates a high-energy tomographic image 10 as the high-energy tomographic image acquired here. The high-energy tomographic image 10 in this embodiment is an image displayed by MIP (Maximum Intensity Projection) and is a tomographic image acquired by capturing an image of a subject containing a contrast agent. Because the calcified region 801, as in a box 401 in FIG. 4, displayed by MIP has a higher signal value than that of a contrast-image blood vessel on the high-energy tomographic image 10, the lumen of the blood vessel (particularly, whether the blood vessel can have a blood flow or not) may not be clearly visible. Therefore, the high-energy tomographic image 10 displayed by MIP is not suitable for rating a coronary artery catheter.

In step S302, the image acquiring unit 101 in the medical image processing apparatus 100 acquires from the modality 1000 a virtual non-contrast image (VNC image) generated by the modality 1000. The VNC image may be generated by the medical image processing apparatus 100 instead of the modality 1000. This processing corresponds to an example of an acquiring unit configured to acquire a virtual non-contrast image generated by using a first medical image acquired by capturing, with first energy, a subject containing a contrast agent and a second medical image acquired by capturing the subject with second energy. The virtual non-contrast image (VNC) image may be a VNC image 20 illustrated in FIG. 4, for example. The VNC image 20 may be a non-contrast image which can be displayed, on the modality 1000, with a reduced influence of a contrast agent (iodine) from at least two contrast-images of a high-energy tomographic image and a low-energy tomographic image. For example, a CT value of soft tissue not containing iodine may be calculated by a substance-separation method called 3-material decomposition to generate a VNC image. For example, a generating method of such a VNC image as described in U.S. Pat. Pub. 2011/0064292 is herein incorporated by reference. The VNC image 20 illustrated in FIG. 4 is displayed by MIP. The calcified region 801 is displayed in white on the VNC image 20, and a state of the lumen of a blood vessel is not clearly visible in the VNC image 20.

In step S303, the region-removed image generating unit 104 in the medical image processing apparatus 100 performs processing for extracting and identifying the calcified region 801 from the VNC image acquired in step S302. This processing corresponds to an example of a first identification unit configured to identify a removal-subject region included in a virtual non-contrast image acquired by the acquiring unit. A method for extracting the calcified region 801 will be described more specifically.

Figure 5:
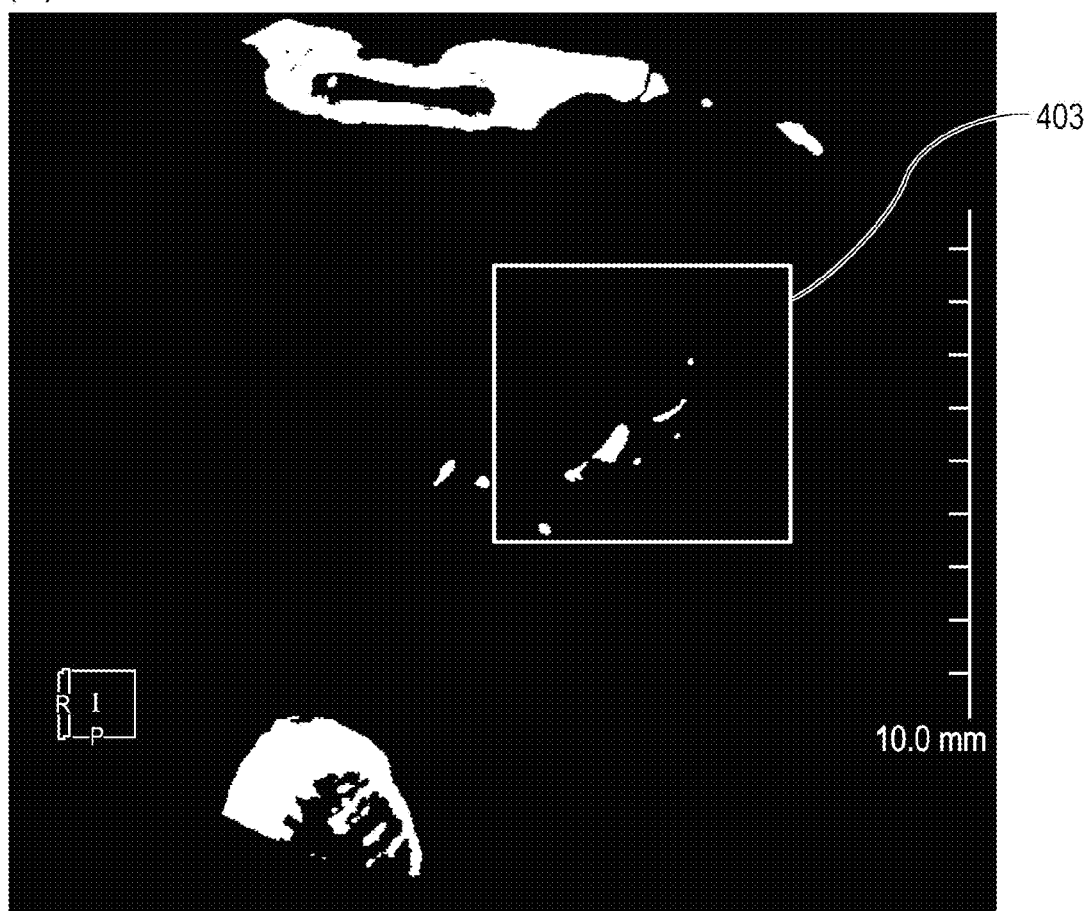
FIG. 5 illustrates an example of a binarized virtual non-contrast image.
Figure 8:
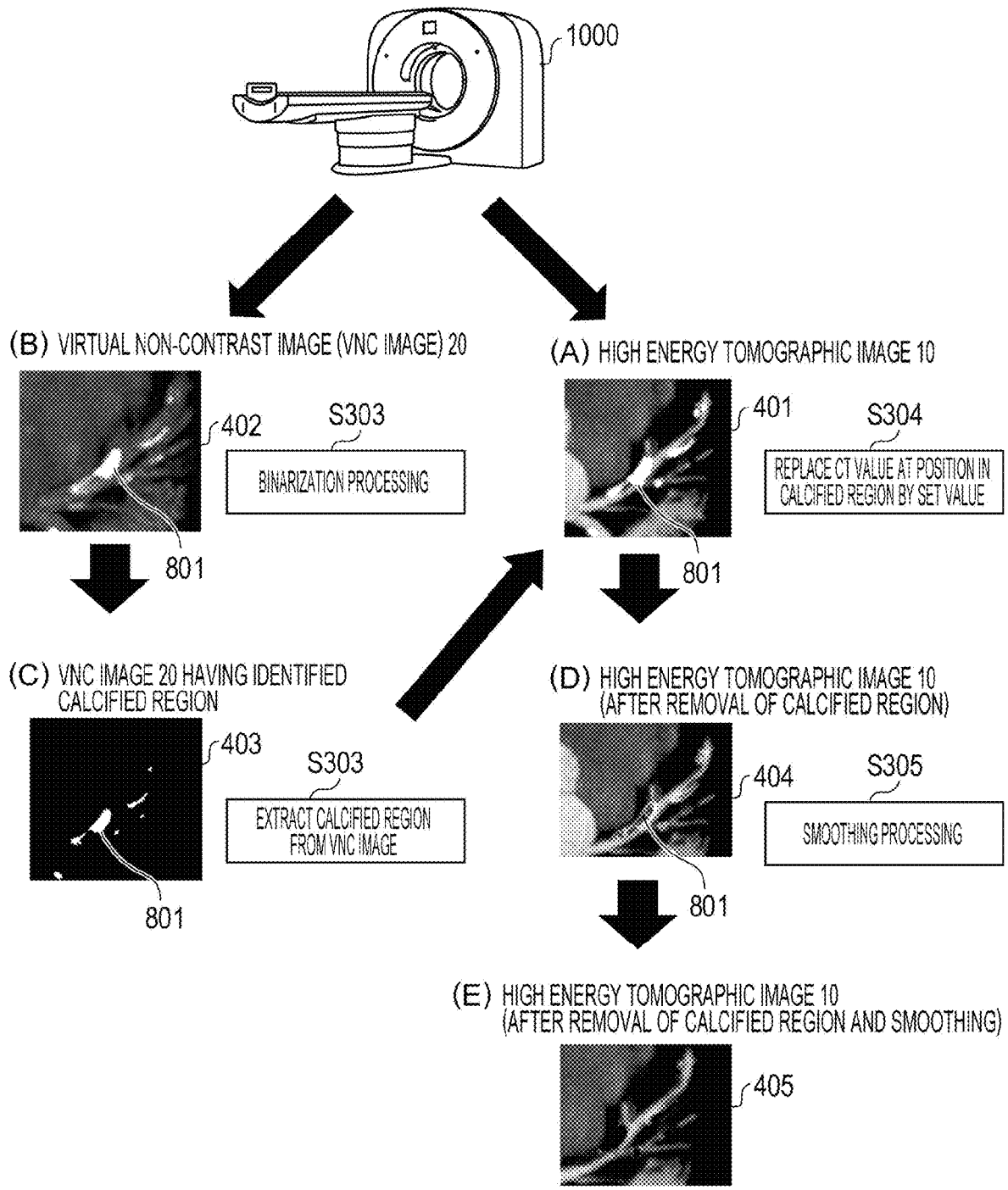
FIG. 8 is a conceptual diagram schematically illustrating a flow of processing according to an embodiment.

Because FIG. 8 is a configuration diagram schematically illustrating a flow of image processing, the method will be described with reference to FIG. 8. First, the medical image processing apparatus 100 identifies a voxel having a signal value equal to or higher than 200 on a (B) VNC image 20 acquired from the modality 1000. (FIG. 8 illustrates the region 402 on the VNC image 20 in FIG. 4.) Then, a (C) VNC image 20 having a calcified region is generated from which at least the calcified region 801 and a bone region (pixels) are identifiable. (FIG. 8 illustrates a region 403 of the (C) VNC image 20 having the identified calcified region in FIG. 5). FIG. 5 illustrates the (C) VNC image 20 having the identified calcified region. A voxel having a signal value equal to or higher than 200 may be identified by, for example, binarization processing. This corresponds to an example of the first identifying unit configured to identify a removal-subject region by performing binarization processing on a virtual non-contrast image. A threshold value in the binarization processing may be a threshold value enabling identification of regions representing at least a calcified region 801 and a bone. The signal value equal to or higher than 200 is given for illustration purpose, and, without limiting the value, the threshold value may be any one of other values. With reference to the signal-value threshold value equal to or higher than 200 as in this embodiment, at least the calcified region 801 and a bone region can be identified.

The (C) VNC image 20 having the identified calcified region may be used to extract a position of a voxel corresponding to the calcified region 801. The extracted position is stored. Here, the (C) VNC image 20 having the identified calcified region may be generated by adjusting the threshold value for the binarization by a user. Having described the binarization processing as an example of a method for extracting and identifying the calcified region 801, segmentation based on a CT value may be performed to extract and identify the calcified region 801 as another method, or a user may manually extract and identify the calcified region 801. This processing corresponds to an example of the first identifying unit configured to identify a removal-subject region by performing a segmentation process on a virtual non-contrast image.

In step S304, the region-removed image generating unit 104 in the medical image processing apparatus 100 identifies a pixel in a region corresponding to the position of the calcified region 801 extracted in step S303 from one of the tomographic images acquired in step S301. This processing corresponds to a second identifying unit configured to identify a region of a first medical image or a second medical image corresponding to a removal-subject region identified by the first identifying unit.

This embodiment is further described by using the (A) high-energy tomographic image 10 as an example. Dual-energy imaging enables acquisition of a high-energy tomographic image and a low-energy tomographic image through one image-capturing operation. In other words, registration is not necessary between a subject rendered on a high-energy tomographic image and a subject rendered on a low-energy tomographic image. These images are rendered at substantially identical positions on the corresponding tomographic images. The same is true for VNC image generated from the tomographic images. In other words, the regions of the tomographic images corresponding to the removal-subject region identified in the VNC image are located at substantially the same position as the position in the VNC image. Because the use of such a VNC image eliminates the necessity for the registration processing, the processing time in the medical image processing apparatus can be reduced. This processing corresponds to an example of the second identifying unit configured to identify on the first medical image or the second medical image a region having substantially-identical coordinate values to those of a region identified by the first identifying unit.

The region-removed image generating unit 104 then changes the CT values (pixel values) of the pixels in the identified region. This processing corresponds to an example of a changing unit configured to change pixel values of a region identified by the second identifying unit to values lower than the pixel values. Having described that, according to this embodiment, the CT value of an identified region is changed to a set value, 0, some embodiments are not limited thereto. For example, the value may be changed to a value infinitely close to 0. This processing corresponds to an example of the changing unit configured to reduce the pixel values of the region identified by the second identifying unit. It may only be required to hide the calcified region 801 when displayed by MIP. Therefore, a region with a contrast agent (such as iodine) may be identified, and the set value may be defined to be lower than the current CT values of the identified region. This processing corresponds to an example of the changing unit configured to change pixel values of the region identified by the second identifying unit to values lower than the pixel values of a region which is included in the first medical image or the second medical image and which is influenced by a contrast agent. Having described that, therefore, the set value is "0" according to this embodiment, the set value may be any other value.

FIG. 6 illustrates a (D) high-energy tomographic image 10 (after removal of the calcified region) which is an example of the high-energy tomographic image 10 after the change. FIG. 8 illustrates a region 404 of the (D) high-energy tomographic image 10 (after removal of the calcified region). Apparently from the region 404, the CT values of the pixels corresponding to the calcified region 801 may be set lower than the CT value of the contrast agent so that an image can be generated from which a state of the lumen of the blood vessel displayed by MIP can be easily grasped. Alternatively, in order to display a tomographic image by volume rendering on the display device 210, the transparency of the pixels corresponding to the position of the calcified region 801 may be increased to hide. For the hiding, the transparency may be a degree that a user can easily visually recognize the region.

In step S305, the region-removed image generating unit 104 in the medical image processing apparatus 100 performs smoothing processing on the calcified region 801 (including its surroundings) having CT values replaced in step S304. This processing corresponds to an example of the changing unit configured to further change pixel values of a region identified by the second identifying unit and to perform smoothing processing on surroundings of the region. FIG. 6 illustrates a (E) high-energy tomographic image 10 (after removal of the calcified region and smoothing) that is an image having undergone the smoothing processing. FIG. 8 illustrates a region 405 of the (E) high-energy tomographic image 10 (after removal of calcified region and smoothing). Performing the smoothing can resolve unnaturalness of an image due to a partial volume effect that can be found in the region 404 and enables a viewer to grasp a natural running state of the coronary artery from which the calcified region 801, as in the region 405, is removed. It should be noted that the smoothing processing is not a required configuration for removal of the calcified region 801.

Figure 7:
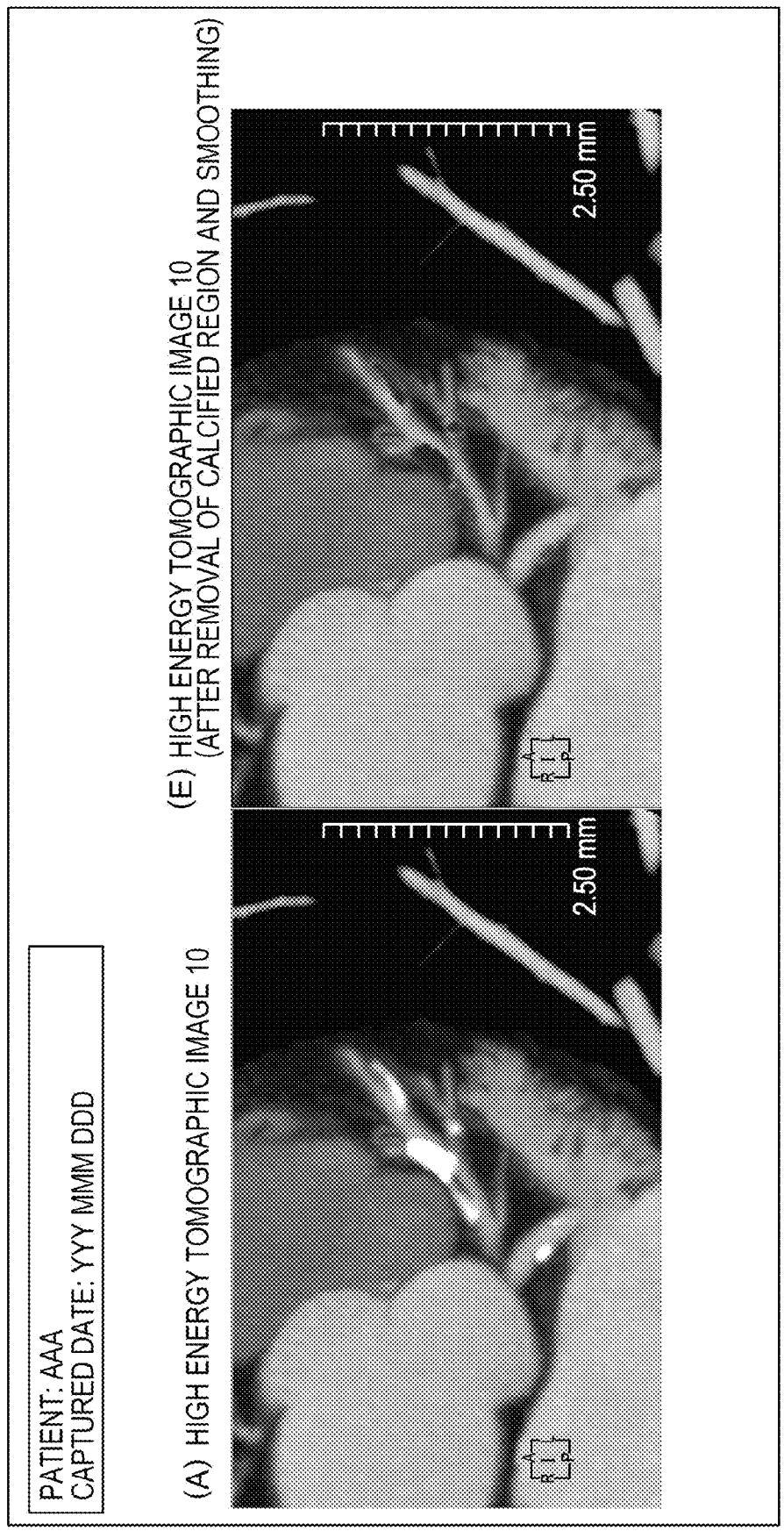
FIG. 7 is a conceptual diagram illustrating an example of a screen configuration enabling comparison between a high-energy tomographic image from which a calcified region is removed and on which smoothing processing is performed and an unprocessed high-energy tomographic image.

In step S306, the display control unit 105 in the medical image processing apparatus 100 acquires the (A) high-energy tomographic image 10 acquired in step S301 and the (E) high-energy tomographic image 10 (after removal of the calcified region and smoothing) having undergone the smoothing processing in step S305. With respect to the (A) high-energy tomographic image 10, the (A) high-energy tomographic image 10 may be copied before the processing is performed in step S304, and the copied (A) high-energy tomographic image 10 may be acquired. Then, the acquired image may be displayed on the display device 210 in a comparable manner. This processing corresponds to an example of the display control unit configured to display on the display unit, in a comparable manner, the first medical image or the second medical image having pixel values changed by the changing unit and the first medical image or the second medical image having pixel values not changed by the changing unit. For example, the images may be displayed on the display device 210 in a manner as illustrated in FIG. 7. This can help a user judge whether the coronary artery has a completely closed state due to the calcified region 801 or not. It should be noted that the processing in step S306 is not a required configuration. The processing result in step S304 or step S305 may be stored in a storage unit such as the external memory 211, which is followed by end of this processing.

In this manner, an image from which the calcified region 801 of a blood vessel is removed can be generated by performing one image-capturing operation on the blood vessel containing a contrast agent. Therefore, a patient including the blood vessel can be completely inspected with a low-exposure dose. In a case where the removal-subject region has a CT value closer to that of a contrast agent, an image from which only the removal-subject region is appropriately removed.

First Variation Example

According to a variation example of the embodiment of the present disclosure, a mechanism is provided which removes the calcified region 801 (corresponding to a removal-subject region) from a blood-vessel region containing a contrast agent. The present disclosure is applicable to not only the mechanism but also to various forms. According to another example, the present disclosure is also applicable to an image of a subject including a region including an artificial treating tool such as a stent-graft, a calcified region, and a contrast agent.

Figure 9:
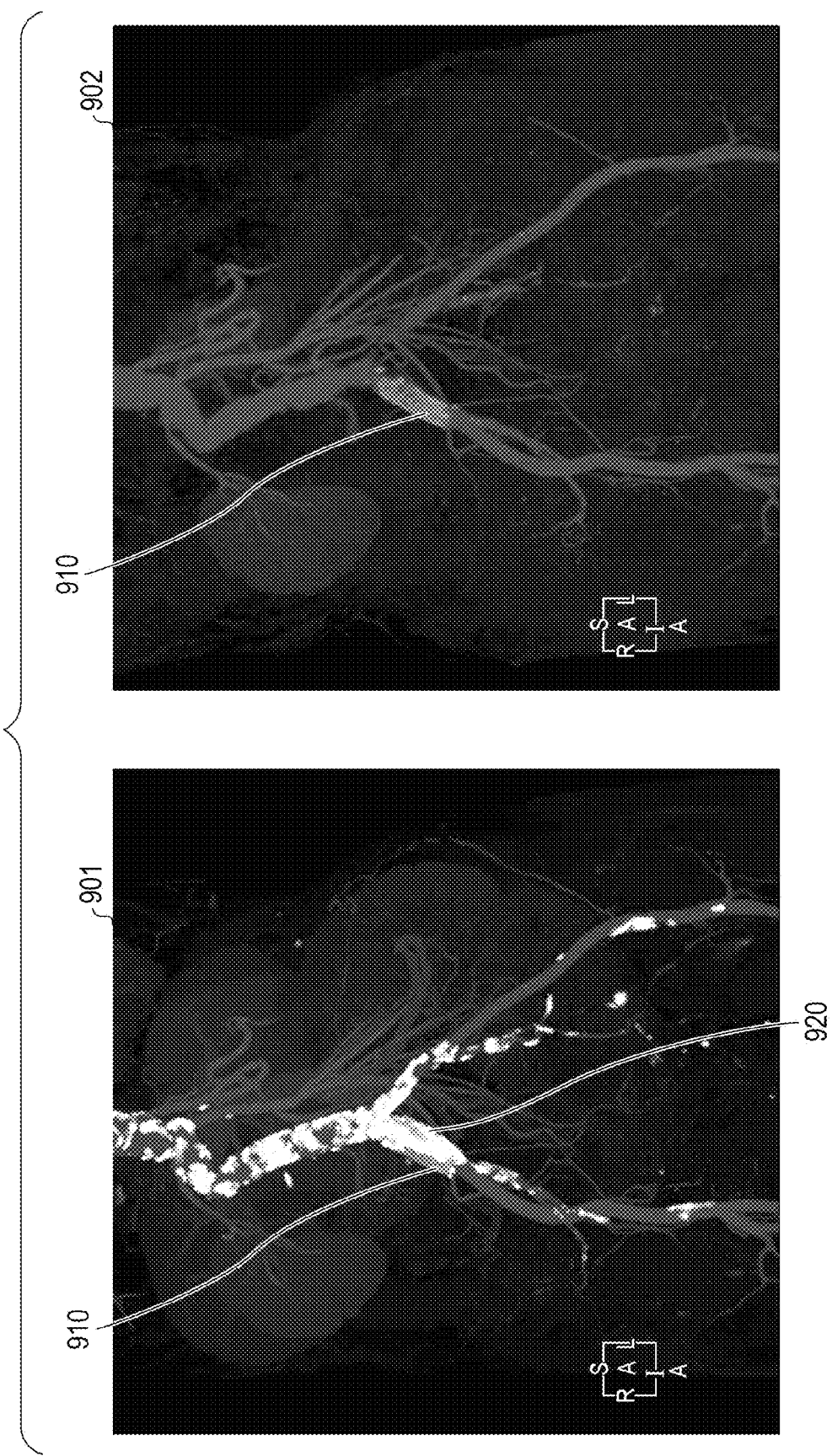
FIG. 9 illustrates images for explaining other application examples.

This will be described more specifically below. First, the modality 1000 performs dual-energy imaging on the subject. The modality 1000 generates a VNC image based on a high-energy tomographic image and a low-energy tomographic image acquired by image-capturing. The medical image processing apparatus 100 acquires the generated VNC image. In this manner, a high-energy tomographic image and a low-energy tomographic image may be acquired from the modality 1000, and the medical image processing apparatus 100 may generate a VNC image therefrom. Because the generated VNC image is an image from which an influence of a contrast agent is removed (or reduced), the VNC image shows a stent-graft and a calcified region. FIG. 9 illustrates concrete examples of the VNC image. Referring to FIG. 9, a VNC image 901 is an image from which an influence of a contrast agent removed (or reduced) and includes a stent-graft 910 and a calcified region 920 in a patient.

The medical image processing apparatus 100 executes binarization processing on the VNC image. The threshold value for the binarization processing may be a value with reference to which pixels (voxels) corresponding to a calcified region can be identified through the binarization processing. In other words, the threshold value for the binarization processing may be higher than a signal value of pixels excluding the pixels corresponding to the calcified region and may be lower than a signal value of pixels corresponding to the calcified region. The pixels corresponding to the calcified region are identified from the binarized VNC image, and pixels corresponding to the identified pixels are identified in the high-energy tomographic image or the low-energy tomographic image. The signal values of the pixels identified in the high-energy tomographic image or the low-energy tomographic image are replaced by a set value (such as 0). FIG. 9 illustrates a post-application image 902 corresponding to an example of the thus processed image. An influence of a contrast agent is removed (or reduced), and the calcified region 920 is removed from the post-application image 902. Therefore, the stent-graft 910 can be identified. A user can check the post-application image 902 to appropriately grasp whether the stent-graft 910 indwelled within the body of the patient is positioned correctly.

Second Variation Example

Figure 10:
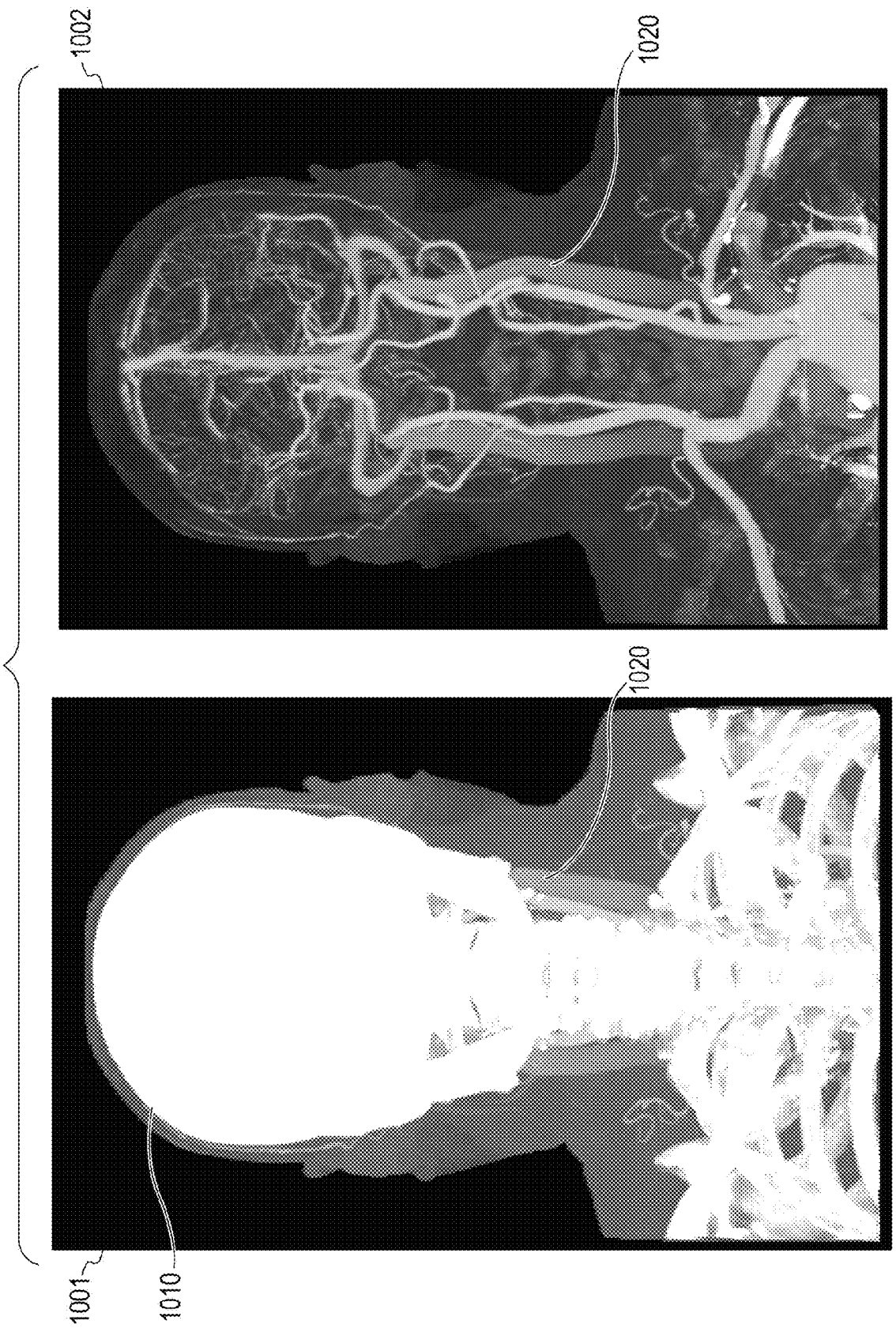
FIG. 10 illustrates images for explaining other application examples.

According to another example embodiment of the present disclosure, the present disclosure is also applicable to an image acquired by contrast-imaging the head. In other words, a subject to be removed may be not only a calcified region but also a bone region. This will be described more specifically with reference to images illustrated in FIG. 10. Referring to FIG. 10, a pre-application image 1001 is a medical image before the processing is applied. The pre-application image 1001 is a medical image acquired by contrast-imaging a blood vessel acquired from a CT apparatus. The pre-application image 1001 has a contrast-image blood vessel 1020 and a bone 1010 (corresponding to a removal-subject region) of a patient. When a user tries to perform diagnosis based on the contrast-imaged blood vessel 1020 in the pre-application image 1001, the bone 1010 is overlapped with the contrast-image blood vessel 1020, which may prevent an easy diagnosis. The post-application image 902 is an example of an image after the processing is applied. The post-application image 902 does not show the bone 1010, and the contrast-image blood vessel 1020 is identifiable thereon. A user can check the post-application image 1002 to appropriately grasp the state of the contrast-image blood vessel 1020 of a patient.

Accordingly, the present disclosure describes an image which facilitates diagnosis performed on a patient while reducing the exposure dose of the patient.

Having described that high-energy tomographic images are displayed in a comparable manner according to this embodiment, displaying low-energy tomographic images in a comparable manner is also included in the present disclosure.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), a digital versatile disc (DVD), or a Blu-ray Disc (BD)™), a flash memory device, a memory card, and the like. While the present disclosure describes exemplary embodiments, it is to be understood that the claims are not limited to the exemplary embodiments. The scope of the following claims is to be accorded the broadest interpretation so as to encompass all such modifications and equivalent structures and functions.

This application claims the benefit of Japanese Patent Application No. 2017-079652, which was filed on Apr. 13, 2017, and Japanese Patent Application No. 2017-250356, which was filed on Dec. 27, 2017, both of which are hereby incorporated by reference in their entireties.

What is claimed is:

1. A medical image processing apparatus comprising:
    an acquiring unit configured to acquire a virtual non-contrast image generated by using a first medical image acquired by image-capturing a subject containing a contrast agent with a first energy and a second medical image acquired by image-capturing the subject with a second energy;
    a first identifying unit configured to identify a removal-subject region included in the virtual non-contrast image acquired by the acquiring unit;
    a second identifying unit configured to identify a region of the first medical image or the second medical image, the region corresponding to the removal-subject region identified by the first identifying unit; and
    a changing unit configured to change luminance values of the region identified by the second identifying unit to a value lower than the luminance values.

2. The medical image processing apparatus according to claim 1, wherein the changing unit changes the luminance values of the region identified by the second identifying unit and included in the first medical image or the second medical image to a value lower than luminance values of a region influenced by the contrast agent.

3. The medical image processing apparatus according to claim 1, wherein the first identifying unit identifies the removal-subject region by performing binarization processing on the virtual non-contrast image.

4. The medical image processing apparatus according to claim 1, wherein the first identifying unit identifies the removal-subject region by performing segmentation processing on the virtual non-contrast image.

5. The medical image processing apparatus according to claim 1, wherein the second identifying unit identifies a region having coordinate values substantially identical to those of the region identified by the first identifying unit in the first medical image or the second medical image.

6. The medical image processing apparatus according to claim 1, further comprising:
a display control unit configured to display, on a display unit in a comparable manner, the first medical image or the second medical image having the luminance values changed by the changing unit and the first medical image or the second medical image having the luminance values not changed by the changing unit.

7. The medical image processing apparatus according to claim 6, wherein the display control unit displays the first medical image or the second medical image on the display unit by maximum intensity projection.

8. The medical image processing apparatus according to claim 1, wherein the changing unit further changes the luminance values of the region identified by the second identifying unit and performs smoothing processing on surroundings of the region.

9. The medical image processing apparatus according to claim 1, wherein the removal-subject region is at least a calcified region or a bone region.

10. A control method for a medical image processing apparatus, the method comprising:
acquiring a virtual non-contrast image generated by using a first medical image acquired by image-capturing a subject containing a contrast agent with a first energy and a second medical image acquired by image-capturing the subject with a second energy;
identifying a removal-subject region included in the virtual non-contrast image acquired by the acquiring;
identifying a region of the first medical image or the second medical image, the region corresponding to the removal-subject region identified by the first identifying; and
changing luminance values of the region identified by the second identifying step to a value lower than the luminance values.

11. A non-transitory storage medium storing a program causing a medical image processing apparatus to function as:
an acquiring unit configured to acquire a virtual non-contrast image generated by using a first medical image acquired by image-capturing a subject containing a contrast agent with a first energy and a second medical image acquired by image-capturing the subject with a second energy;
a first identifying unit configured to identify a removal-subject region included in the virtual non-contrast image acquired by the acquiring unit;
a second identifying unit configured to identify a region of the first medical image or the second medical image, the region corresponding to the removal-subject region identified by the first identifying unit; and
a changing unit configured to change luminance values of the region identified by the second identifying unit to a value lower than the luminance values.

* * * * *